United States Patent
Ruth

(10) Patent No.: US 6,854,577 B2
(45) Date of Patent: Feb. 15, 2005

(54) SOUND DAMPENED ONE-WAY CLUTCH

(75) Inventor: Stephen M. Ruth, Holly, MI (US)

(73) Assignee: Means Industries, Inc., Saginaw, MI (US)

(*) Notice: Subject to any disclaimer, the term of this patent is extended or adjusted under 35 U.S.C. 154(b) by 0 days.

(21) Appl. No.: 10/426,375

(22) Filed: Apr. 29, 2003

(65) Prior Publication Data
US 2004/0216975 A1 Nov. 4, 2004

(51) Int. Cl.$^7$ ............................................. F16D 41/12
(52) U.S. Cl. ........................ 192/46; 192/69.1; 192/71; 192/72
(58) Field of Search ........................... 192/46, 69.1, 71, 192/72, 108; 188/82.7, 82.74, 82.77

(56) References Cited

U.S. PATENT DOCUMENTS 5,449,057 A * 9/1995 Frank ........................... 192/46
5,597,057 A    1/1997 Ruth et al.
5,954,174 A    9/1999 Costin
6,193,038 B1   2/2001 Scott et al.
6,333,112 B1  12/2001 Field et al.

* cited by examiner

Primary Examiner—Richard M. Lorence
(74) Attorney, Agent, or Firm—Brooks Kushman P.C.

(57) ABSTRACT

A one-way clutch includes a first member having multiple first recesses, and a second member having multiple second recesses that are alignable with the first recesses. Each recess includes a load-bearing surface. The clutch also includes multiple engaging elements that are engageable with the load-bearing surfaces of the recesses to effect one-way torque transfer between the first and second members. At least one of the engaging elements comprises a non-metallic, compressible material and is configured to compress upon engagement with a respective load-bearing surface of each member to inhibit relative movement of the members.

28 Claims, 4 Drawing Sheets

SOUND DAMPENED ONE-WAY CLUTCH

BACKGROUND OF THE INVENTION

1. Field of the Invention

The invention relates to one-way clutches for use in mechanisms such as power transmissions.

2. Background Art

Clutches are used in a wide variety of applications to selectively couple power from a first rotatable driving member, such as a driving disk or plate, to a second, independently rotatable driven member, such as a driven disk or plate. In one known variety of clutches, commonly referred to as "one-way" or "overrunning" clutches, the clutch engages to mechanically couple the driving member to the driven member only when the driving member rotates in a first direction relative to the driven member. Once so engaged, the clutch will release or decouple the driven member from the driving member only when the driving member rotates in a second, opposite direction relative to the driven member. Further, the clutch otherwise permits the driving member to freely rotate in the second direction relative to the driven member. Such "freewheeling" of the driving member in the second direction relative to the driven member is also known as the "overrunning" condition.

One type of one-way clutch includes coaxial driving and driven plates having generally planar clutch faces in closely spaced, juxtaposed relationship. A plurality of recesses or pockets is formed in the face of the driving plate at angularly spaced locations about the axis, and a strut or pawl is disposed in each of the pockets. Multiple recesses or notches are formed in the face of the driven plate and are engageable with one or more of the struts when the driving plate is rotating in a first direction. When the driving plate rotates in a second direction opposite the first direction, the struts disengage the notches, thereby allowing freewheeling motion of the driving plate with respect to the driven plate.

When the driving plate reverses direction from the second direction to the first direction, the driving plate typically rotates relative to the driven plate until the clutch engages. As the amount of relative rotation increases, the potential for an engagement noise also increases.

SUMMARY OF THE INVENTION

The invention addresses the shortcomings of the prior art by providing a one-way clutch that is configured to reduce engagement noise.

According to one embodiment of the invention, a one-way clutch includes a first member having first and second pockets, and a second member having first and second notches that are alignable with the first and second pockets, respectively. A first engaging element is cooperable with the first pocket and engageable with a load-bearing surface of the first notch to effect one-way torque transfer between the first and second members. The clutch further includes a second engaging element that is cooperable with the second pocket and engageable with a load-bearing surface of the second notch. The second engaging element comprises a non-metallic, compressible material, and is configured to compress upon engagement with the load-bearing surface of the second notch to inhibit relative movement of the members prior to engagement of the first engaging element with the load-bearing surface of the first notch.

According to another embodiment, a one-way clutch includes a first member having multiple pockets, and a second member having multiple notches. The notches are alignable with the pockets, and each notch has a load-bearing surface. Multiple first engaging elements are cooperable with the pockets and selectively engageable with the load-bearing surfaces of the notches to effect one-way torque transfer between the first and second members. The clutch further includes multiple second engaging elements that are also cooperable with the pockets and selectively engageable with the load-bearing surfaces of the notches. Each second engaging element comprises a non-metallic, compressible material and is configured to compress upon engagement with the load-bearing surface of a respective notch to inhibit relative movement of the members prior to engagement of at least one first engaging element with the load-bearing surface of a respective notch.

Further under the invention, a one-way clutch includes a first member having multiple first recesses, and a second member having multiple second recesses that are alignable with the first recesses. Each recess includes a load-bearing surface. The clutch also includes multiple engaging elements that are engageable with the load-bearing surfaces of the recesses to effect one-way torque transfer between the first and second members. At least one of the engaging elements comprises a non-metallic, compressible material and is configured to compress upon engagement with a respective load-bearing surface of each member to inhibit relative movement of the members.

According to yet another embodiment of the invention, a one-way clutch includes a first member having a first recess, and a second member having a second recess that is alignable with the first recess. The first and second recesses each have a load-bearing surface. The clutch further includes an engaging element that is engageable with the load-bearing surfaces of the recesses to facilitate one-way torque transfer between the first and second members. The engaging element comprises a non-metallic, compressible material and is configured to compress upon engagement with the load-bearing surfaces of the recesses to inhibit relative movement of the members.

While exemplary clutches in accordance with the invention are illustrated and disclosed, such disclosure should not be construed to limit the claims. It is anticipated that various modifications and alternative designs may be made without departing from the scope of the invention.

DETAILED DESCRIPTION OF THE PREFERRED EMBODIMENT(S)

Figure 1:
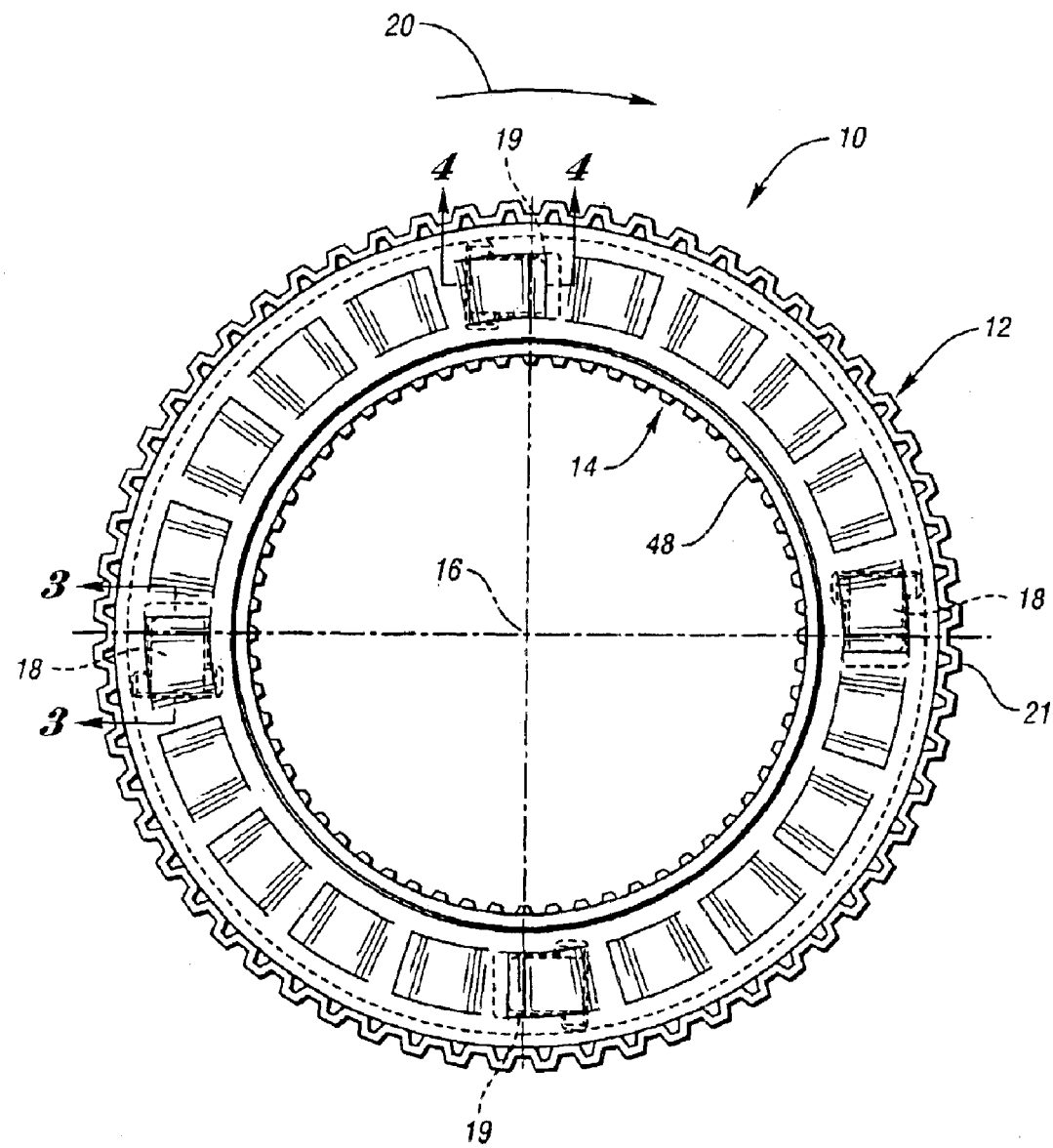
FIG. 1 is a front view of an exemplary planar one-way clutch, in accordance with the invention, including first and second struts.
Figure 2:
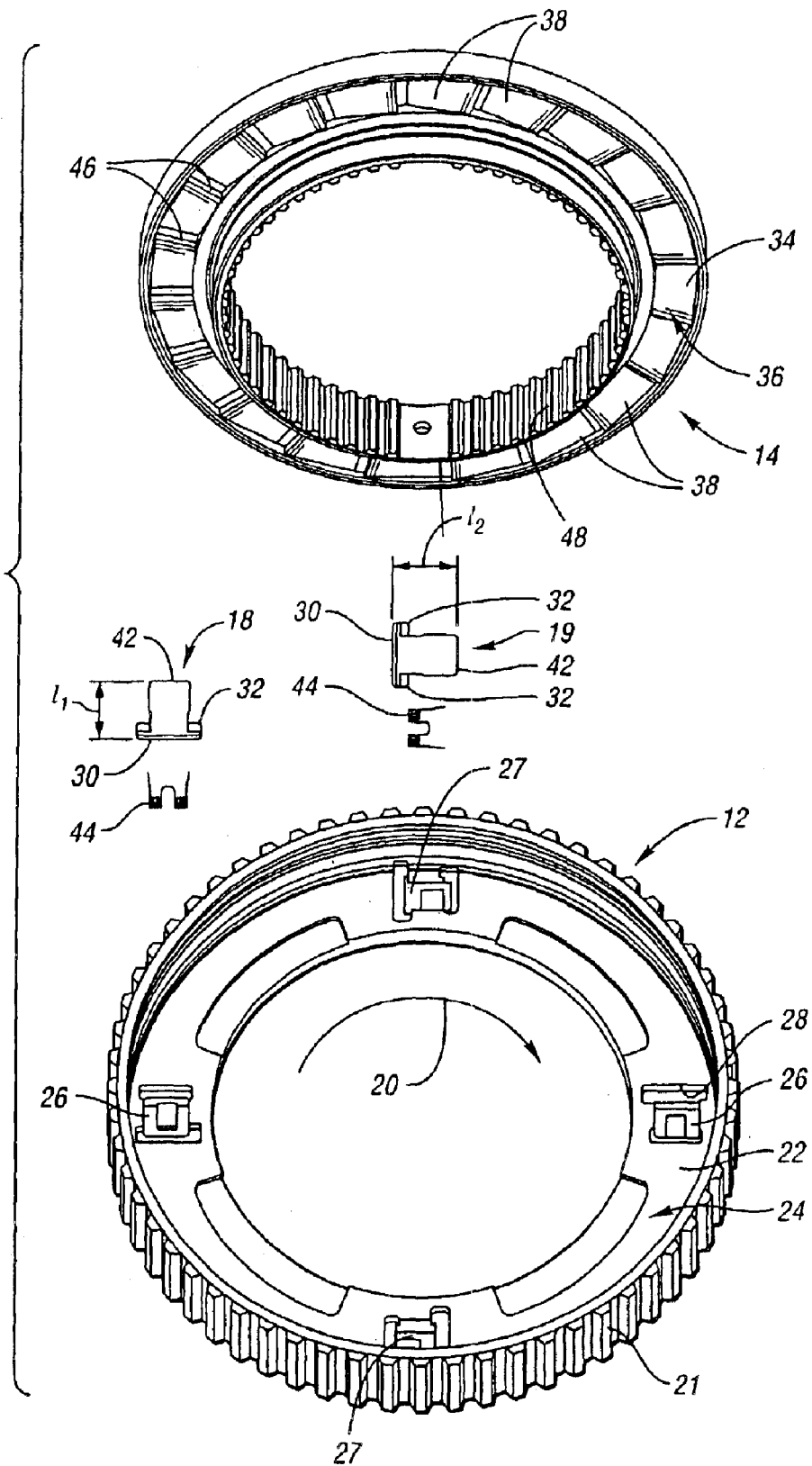
FIG. 2 is an exploded perspective view of the clutch of FIG. 1.

Referring to FIGS. 1 and 2, an exemplary clutch 10 in accordance with the invention includes first and second members, such as a driving member 12 and a driven member 14, both of which are rotatable about a common axis 16. The clutch 10 further includes multiple engaging elements, such as first and second pawls or struts 18 and 19, respectively, disposed between the driving member 12 and the driven member 14, which operate to mechanically couple the driving member 12 to the driven member 14 only when the driving member 12 rotates in a first direction 20 about the axis 16. Alternatively, the function of the members 12 and 14 may be switched such that member 14 imparts a motive force to member 12 when the members 12 and 14 are coupled together. Furthermore, one of the members 12 and 14 may be a stationary member.

In the embodiment shown in FIGS. 1 and 2, the clutch 10 includes two first struts 18 and two second struts 19, and the struts 18 and 19 are spaced approximately ninety degrees apart. The first struts 18 may comprise any suitable load-bearing material, and are configured to transmit torque between the members 12 and 14 upon engagement with both members 12 and 14, as explained below in greater detail. For example, each first strut 18 may comprise any suitable metal, such as steel. In accordance with the invention, the second struts 19 may comprise any suitable compressible, non-metallic material, such as a polymeric material including, but not limited to, rubber and/or plastic, and the second struts 19 are configured to dampen engagement noise of the clutch 10, as explained below in detail. For example, a portion of each second strut 19, such as an end portion and/or a middle portion of each second strut 19, may comprise a compressible, non-metallic material or materials, and the remainder of each second strut 19 may comprise a metal, such as steel. As another example, each second strut 19 may be made entirely of a compressible, non-metallic material or materials. In one embodiment of the clutch 10, each second strut 19 may comprise a thermoplastic polyester elastomer such as HYTREL®, which is available from DuPont of Wilmington, Del.

Alternatively, the clutch 10 may be provided with any suitable number of first and second struts 18 and 19, respectively, such that the clutch 10 includes at least one first strut 18 and at least one second strut 19. While not required, the clutch 10 preferably includes an equal number of first and second struts 18 and 19, respectively. Furthermore, if the clutch 10 includes multiple first struts 18 and multiple second struts 19, the clutch 10 may be configured such that one or more first struts 18 and one or more second struts 19 operate to couple the members 12 and 14 together during a particular engagement of the clutch 10.

As yet another alternative, depending on the application, the clutch 10 may be provided without any first struts 18. For example, for low load applications, the clutch 10 may be provided with one or more second struts 19 only.

In the embodiment shown in FIGS. 1 and 2, the driving member 12 has an outer engaging surface 21, such as a splined surface, for receiving rotational input from a cooperating drive shaft (not shown) or other suitable arrangement. The driving member 12 also has a clutch face 22 that defines a first reference surface 24 that extends generally normal to the axis 16. Multiple recesses 26 and 27 are defined in the clutch face 22 of the driving member 12, with each recess 26, 27 including a load-bearing surface or shoulder 28 that is operative to abuttingly engage a first end 30 of a given strut 18, 19 when the driving member 12 rotates in the first direction 20. While the invention contemplates any suitable configuration for the recesses 26 and 27 of the driving member 12, in the exemplary clutch 10, each recess 26 is configured to receive a respective one of the struts 18 and each recess 27 is configured to receive a respective one of the struts 19, such that the struts 18 and 19 are carried by the driving member 12 for rotation therewith about the axis 16.

Figure 3:
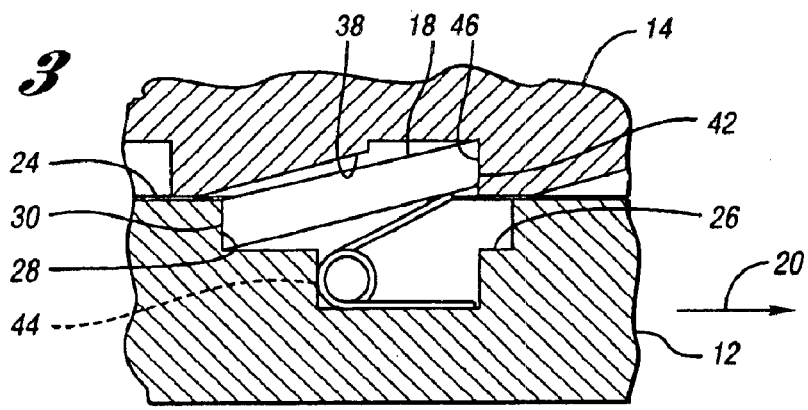
FIG. 3 is a partial sectional view of the clutch, taken along line 3—3 of FIG. 1, illustrating a given first strut in a first, torque-transmitting position.

While the invention contemplates use of any suitable arrangement whereby the first end 30 of a given strut 18 or 19 is positioned within a respective recess 26 or 27 in the driving member's clutch face 24, as seen in FIG. 2, each strut 18, 19 of the exemplary clutch 10 includes a pair of oppositely-projecting ears 32 proximate to first end 30 (only one first strut 18 and one second strut 19 are shown in FIG. 3). The ears 32 cooperatively engage complementary radially-inner and radially-outer surfaces of the respective recess 26 or 27 to thereby position the first end 30 of the strut opposite the shoulder 28 of the respective recess 26 or 27.

The driven member 14 similarly includes a clutch face 34, in close-spaced opposition to the clutch face 22 of the driving member 12, that likewise defines a reference surface 36 that extends generally normal to the axis 16. The driven member's clutch face 34 also includes multiple recesses 38 which, in the exemplary clutch 10, greatly exceed the number of recesses 26 and 27 defined in the driving member 12 to reduce clutch "backlash" upon initial rotation of the driving member 12 in the first rotational direction 20 relative to the driven member 14. Each of the recesses 38 is configured to receive a free, second end 42 of a given strut 18 or 19 when the strut's second end 42 is urged into the recess 38, for example, by a spring 44 seated beneath the strut 18 or 19 in the driving member's recess 26 or 27. Each of the driven member's recesses 38 includes a load-bearing shoulder 46 that is operative to abuttingly engage the second end 42 of a given strut 18 or 19 when the driving member 12 rotates in the first direction 20. The driven member 14 also has an inner engaging surface 48, such as a splined surface, that is engageable with a cooperating driven shaft (not shown), or other suitable arrangement, for transmitting torque thereto.

Figure 4:
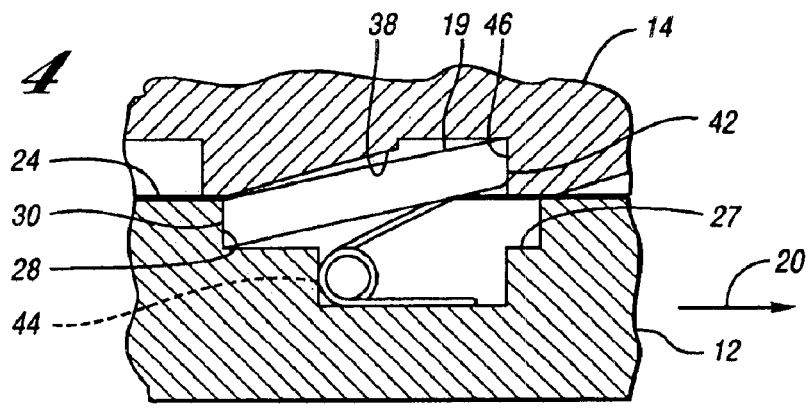
FIG. 4 is a partial sectional view of the clutch, taken along line 4—4 of FIG. 1, illustrating a given second strut in a first, torque-transmitting position.
Figure 5:
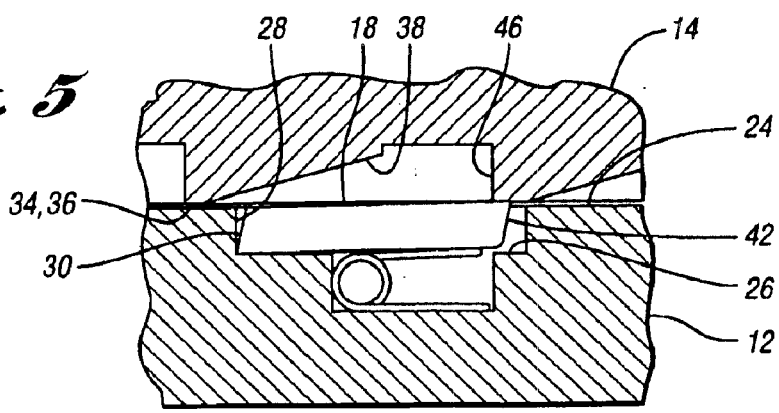
FIG. 5 is a partial sectional view of the clutch of FIG. 1, similar to that of FIG. 3, illustrating the given first strut in a second position.
Figure 6:
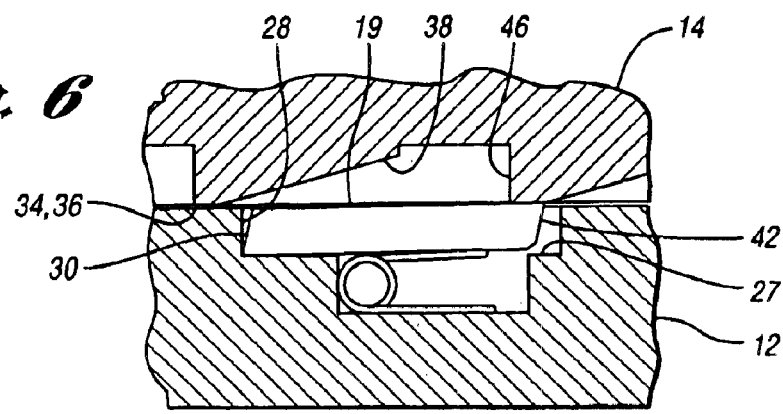
FIG. 6 is a partial sectional view of the clutch of FIG. 1, similar to that of FIG. 4, illustrating the given second strut in a second position.

In the embodiment shown in FIGS. 1 and 2, the second ends 42 of the struts 18 and 19 are selectively engageable with the recesses 38 of the driven member 14. As seen more clearly in the enlarged partial-sectional views of the clutch 10 shown in FIGS. 3–6, each strut 18, 19 is movable between a first position and a second position. The first position of each strut 18, 19 is characterized by abutting engagement of the strut 18, 19 with respective load-bearing shoulders 28 and 46 of the driving and driven members 12 and 14 (as illustrated in FIG. 3 for first strut 18 and FIG. 4 for second strut 19). When the struts 18 and 19 are in the first positions, the struts 18 and 19 are loaded in compression and the members 12 and 14 are coupled together. The second position of each strut 18, 19 is characterized by disengagement of the second end 42 of the strut 18, 19 from the load-bearing shoulder 46 of the respective recess 38 of the driven member 14 (as illustrated in FIG. 5 for first strut 18 and FIG. 6 for second strut 19). While the spring 44 operates to urge a respective strut 18, 19 toward the first position, it will be appreciated that the invention contemplates use of other structures or configurations for urging each strut 18, 19 toward the first position, including, without limitation, any suitable orientation of the recesses 26 and 27 on the driving member 12 whereby the struts 18 and 19 are urged toward the first positions by centrifugal forces upon rotation of the driving member 12 in the first rotational direction 20.

When the driving member 12 rotates in a second direction opposite the first rotational direction 20, each strut 18, 19 is urged toward the second position as a result of contact with the clutch face 34 of the driven member 14. As a result, the driving member 12 is able to rotate with respect to the driven member 14. When the driving member 12 reverses rotation to the first rotational direction 20, each strut 18, 19 is urged toward the first position to mechanically couple the driving member 12 to the driven member 14.

In accordance with the invention, the clutch 10 is configured to enable each second strut 19 to engage both respective load-bearing shoulders 28 and 46 of the driving and driven members 12 and 14 prior to engagement of each first strut 18 with both respective load-bearing shoulders 28 and 46, after the driving member 12 changes direction of rotation from the second rotational direction to the first rotational direction 20. In other words, the clutch 10 is configured such that each second strut 19 achieves its first position prior to each first strut 18 achieving its first position.

In the embodiment shown in FIGS. 1–6, for example, each second strut 19 may be longer than each first strut 18, such that the second ends 42 of the second struts 19 engage load-bearing shoulders 46 of the driven member 14 prior to engagement of the second ends 42 of the first struts 18 with load-bearing shoulders 46 of the driven member 14. For instance, each first strut 18 may have a length $l_1$, and each second strut 19 may have a length $l_2$ that is in the range of two to twenty-five percent greater than length $l_1$, or more particularly in the range of five to twelve percent greater than length $l_1$. Because each second strut 19 comprises a non-metallic, compressible material, the second struts 19 compress upon engagement with the load-bearing shoulders 46, thereby inhibiting relative movement of the members 12 and 14. For example, the second struts 19 may operate to slow down rotational movement of the driving member 12 and/or speed up rotational movement of the driven member 14. After sufficient compression of the second struts 19, each first strut 18 is then able to engage a respective load-bearing shoulder 46, such that the first struts 18 operate to transmit torque between the members 12 and 14. With such a configuration, engagement noise associated with engagement of the first struts 18 with respective load-bearing shoulders 46 may be reduced.

Thus, with the configuration described above, the first struts 18 are configured to transmit torque between the members 12 and 14 upon engagement of each first strut 18 with respective load-bearing shoulders 28 and 46 of the members 12 and 14. Furthermore, the load carried by each second strut 19 may be negligible after each first strut 18 has engaged respective load bearing shoulders 28 and 46.

It should be noted that the recesses 27 may also be larger than the recesses 26 to accommodate the second struts 19. For example, each recess 27 may have a length, corresponding to the length $l_2$ of a respective second strut 19, that is two to twenty-five percent greater than the length of each recess 26.

Figure 7:
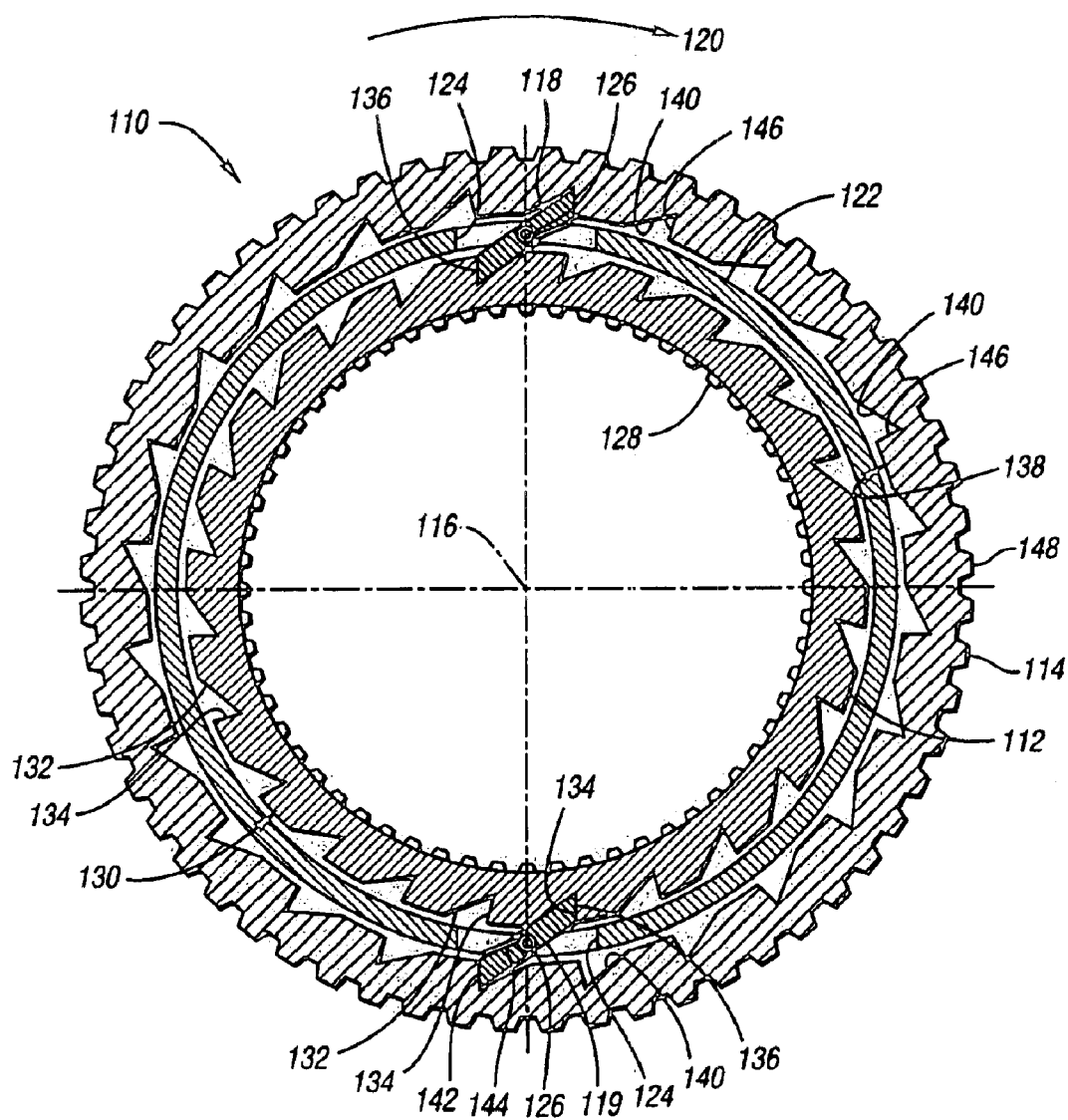
FIG. 7 is a sectional view of an exemplary radial one-way clutch in accordance with the invention.

FIG. 7 shows a second embodiment 110 of a clutch according to the invention. The clutch 110 may be referred to as a radial clutch and includes first and second members, such as an inner race 112 and an outer race 114, both of which are rotatable about a common axis 116. In the embodiment shown in FIG. 7, the inner race 112 functions as a driving member, and the outer race 114 functions as a driven member. The clutch 110 further includes multiple engaging elements, such as first and second pawls or struts 118 and 119, respectively, disposed between the races 112 and 114. The struts 118 and 119 operate to mechanically couple the inner race 112 to the outer race 114 only when the inner race 112 rotates in a first direction 120 about the axis 116. Alternatively, the outer race 114 may function as the driving member, and the inner race 112 may function as the driven member. Furthermore, one of the races 112 and 114 may be a stationary member.

In the embodiment shown in the FIG. 7, the clutch 110 includes one first strut 118 and one second strut 119, and the struts 118 and 119 are spaced one hundred eighty degrees apart. The first strut 118 may comprise any suitable load-bearing material, and is configured to transmit torque between the races 112 and 114 upon engagement with both races 112 and 114, as explained below in greater detail. For example, the first strut may comprise any suitable metal, such as steel. In accordance with the invention, the second strut 119 may comprise any suitable compressible, non-metallic material, such as a polymeric material including, but not limited to, rubber and/or plastic, and the second strut 119 is configured to dampen engagement noise of the clutch 110, as explained below in detail. For example, a portion of the second strut 119, such as an end portion and/or a middle portion of the second strut 119, may comprise a compressible, non-metallic material or materials, and the remainder of the second strut 119 may comprise a metal, such as steel. As another example, the second strut 19 may be made entirely of a compressible, non-metallic material or materials. In one embodiment of the clutch 110, the second strut 119 may comprise a thermoplastic polyester elastomer such as HYTREL®, which is available from DuPont of Wilmington, Del.

Alternatively, the clutch 110 may be provided with any suitable number of first and second struts 118 and 119, respectively, such as two or more first struts 118 and two or more second struts 119. For example, the clutch 110 may include two first struts 118 spaced one hundred eighty degrees apart and two second struts 119 spaced one hundred eighty degrees apart, with each second strut 119 also being spaced ninety degrees from each first strut 118. While not required, the clutch 110 preferably includes an equal number of first and second struts 118 and 119, respectively. Furthermore, if the clutch 110 includes multiple first struts 118 and multiple second struts 119, the clutch 110 may be configured such that one or more first struts 118 and one or more second struts 119 operate to couple the races 112 and 114 together during a particular engagement of the clutch 110.

As yet another alternative, depending on the application, the clutch 110 may be provided without any first struts 118. For example, for low load applications, the clutch 110 may be provided with one or more second struts 119 only.

Furthermore, in the embodiment shown in FIG. 7, the struts 118 and 119 are carried by a carrier member, such as annular carrier ring 122. Each strut 118,119 is pivotally mounted within an aperture 124 of the carrier ring 122. For example, each strut 118 and 119 may include a pair of oppositely projecting arms 126 that are supported in complementary indentations (now shown) formed in the carrier ring 122.

In the embodiment shown in FIG. 7, the inner race 112 has an inner engaging surface 128, such as a splined surface, for receiving rotational input from a cooperating drive shaft (not shown) or other suitable arrangement. The inner race 112 also has a circumferential clutch surface 130 that includes multiple recesses 132, with each recess 132 including a load-bearing surface or shoulder 134 that is operative to abuttingly engage a first end 136 of a given strut 118 or 119 when the inner race 112 rotates in the first direction 120.

The outer race 114 similarly includes a circumferential clutch surface 138, in close-spaced opposition to the clutch surface 130 of the inner race 112, that likewise includes multiple recesses 140 which, in the exemplary clutch 110, equal the number of recesses 132 defined in the inner race 112. Each recess 140 is configured to receive a second end 142 of a given strut 118 or 119 when the strut's second end 142 is urged into the recess 140, for example, by one or more springs 144 engaged with strut 118 or 119 and disposed about each arm 126 of the strut 118 or 119. Each recess 140 includes a load-bearing shoulder 146 that is operative to abuttingly engage the second end 142 of a given strut 118 or 119 when the inner race 112 rotates in the first direction 20. The outer race 114 also has an outer engaging surface 148, such as a splined surface, that is engageable with a cooperating driven shaft (not shown), or other suitable arrangement, for transmitting torque thereto.

In the embodiment shown in FIG. 7, each strut 118, 119 is selectively engageable with the recesses 132 and 140. Furthermore, each strut 118, 119 is movable between a first position and a second position. The first position of each strut 118, 119 is characterized by abutting engagement of the strut 118, 119 with respective load-bearing shoulders 134 and 146 of the races 112 and 114. When the struts 118 and 119 are in the first positions, the struts 118 and 119 are loaded in compression and the races 112 and 114 are coupled together. The second position (not shown) of each strut 118 and 119 is characterized by disengagement of the strut 118 or 119 from at least one of the respective load-bearing shoulders 134, 146, such that the inner race 112 is able to rotate with respect to the outer race 114. While the spring 144 operates to urge a respective strut 118, 119 toward the first position, it will be appreciated that the invention contemplates use of other structures or configurations for urging each strut 118, 119 toward the first position, including, without limitation, any suitable configuration of the struts 118 and 119 and/or orientation of the recesses 132 and 140 whereby the struts 118 and 119 are urged toward the first positions by centrifugal forces upon rotation of the inner race 112 in the first rotational direction 120.

When the inner race 112 rotates in a second direction opposite the first rotational direction 120, each strut 118, 119 is urged toward the second position as a result of contact with the clutch surfaces 130 and 138. When the inner race 112 reverses rotation to the first rotational direction 120, each strut 118, 119 is urged toward the first position to mechanically couple the inner race 112 to the outer race 114.

In accordance with the invention, the clutch 110 is configured to enable the second strut 119 to engage both respective load-bearing shoulders 134 and 146 of the races 112 and 114 prior to engagement of the first strut 118 with both respective load-bearing shoulders 134 and 146, after the inner race 112 changes direction of rotation from the second rotational direction to the first rotational direction 120. In other words, the clutch 110 is configured such that the second strut 119 achieves the first position prior to the first strut 118 achieving the first position.

In the embodiment shown in FIG. 7, for example, the second strut 119 may be longer than the first strut 118, such that the second strut 119 engages respective load-bearing shoulders 134 and 146 prior to engagement of the first strut 118 with respective load-bearing shoulders 134 and 146. For instance, the first strut 118 may have a first length $l_1$, and the second strut 119 may have a second length $l_2$ that is in the range of two to fifteen percent greater than the first length $l_1$, or more particularly in the range of five to twelve percent greater than the fist length $l_1$. Because the second strut 119 comprises a compressible material, the second strut 119 compresses upon engagement with the load-bearing shoulders 134 and 146, thereby inhibiting relative movement of the races 112 and 114 prior to engagement of the second strut 119 with both respective load-bearing shoulders 134 and 146. For example, the second strut 119 may operate to slow down rotational movement of the inner race 112 and/or speed up rotational movement of the outer race 114. As a result, engagement noise associated with engagement of the first strut 118 with respective load-bearing shoulders 134 and/or 146 may be reduced.

Thus, with the configuration described above, the first strut 118 is configured to transmit torque between the races 112 and 114 upon engagement with respective load-bearing shoulders 134 and 146 of the races 112 and 114. Furthermore, the load carried by the second strut 119 may be negligible after the first strut 118 has engaged the respective load bearing shoulders 134 and 146.

It should also be noted that each clutch 10, 110 may include one or more retaining elements, such as weirs or snap rings, that are engaged with one or more of the clutch components for inhibiting lateral movement of the clutch components. Furthermore, each of the recesses 26, 27 and 38 of the clutch 10, and each of the recesses 132 and 140 of the clutch 110 may be referred to as a pocket or notch.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, while the struts of the exemplary clutch 10 are carried by the driving member, it will be appreciated that the invention contemplates carrying the struts in the recesses of the driven member. Furthermore, the struts may be carried by a separate element, such as a carrier plate, that is disposed between the clutch faces of the driving and driven members. In addition, while the struts of the exemplary clutch 110 are carried by a carrier ring, it will be appreciated that the invention contemplates carrying the struts in the recesses of the inner race or outer race. Moreover, each strut of the exemplary clutches 10 and 110 may have any suitable configuration. For example, each strut may have a middle portion that is thicker than each end portion of the strut.

What is claimed is:

1. A one-way clutch comprising:
   a first member having first and second pockets;
   a second member having first and second notches that are alignable with the first and second pockets, respectively, each notch having a load-bearing surface;
   a first engaging element that is cooperable with the first pocket and engageable with the load-bearing surface of the first notch to effect one-way torque transfer between the first and second members; and
   a second engaging element that is cooperable with the second pocket and engageable with the load-bearing surface of the second notch, the second engaging element comprising a non-metallic, compressible material and being configured to compress upon engagement with the load-bearing surface of the second notch to inhibit relative movement of the members prior to engagement of the first engaging element with the load-bearing surface of the first notch;

wherein the second engaging element is longer than the first engaging element.

2. The one-way clutch of claim 1 wherein the first engaging element has a first length, and the second engaging element has a second length that is at least five percent greater than the first length.

3. The one-way clutch of claim 1 wherein the first engaging element has a first length, and the second engaging element has a second length that is in the range of two to twenty-five percent greater than the first length.

4. The one-way clutch of claim 1 wherein the second engaging element comprises rubber.

5. The one-way clutch of claim 1 wherein the second engaging element comprises plastic.

6. The one-way clutch of claim 1 wherein the first and second members each have a generally planar clutch face, the clutch face of the first member including the pockets, and the clutch face of the second member including the notches.

7. The one-way clutch of claim 1 wherein the first and second members each have a circumferential surface in close-spaced opposition with the circumferential surface of the other member, the circumferential surface of the first member including the pockets, and the circumferential surface of the second member including the notches.

8. The one-way clutch of claim 1 wherein the first engaging element comprises metal.

9. The one-way clutch of claim 8 wherein the first engaging element is configured to carry more load than the second engaging element when the first engaging element is engaged with the load-bearing surface of the first notch and the second engaging element is engaged with the load-bearing surface of the second notch.

10. A one-way clutch comprising:
a first member having multiple pockets;
a second member having multiple notches that are alignable with the pockets, each notch having a load-bearing surface;
multiple first engaging elements that are cooperable with the pockets and selectively engageable with the load-bearing surfaces of the notches to effect one-way torque transfer between the first and second members; and
multiple second engaging elements that are cooperable with the pockets and selectively engageable with the load-bearing surfaces of the notches, each second engaging element comprising a non-metallic, compressible material and being configured to compress upon engagement with the load-bearing surface of a respective notch to inhibit relative movement of the members prior to engagement of at least one first engaging element with the load-bearing surface of a respective notch;
wherein at least one of the second engaging elements is longer than at least one of the first engaging elements.

11. The one-way clutch of claim 10 wherein each first engaging element comprises metal.

12. The one-way clutch of claim 10 wherein the at least one first engaging element has a first length, and the at least one second engaging element has a second length that is at least five percent greater than the first length.

13. The one-way clutch of claim 10 wherein the at least one first engaging element has a first length, and the at least one second engaging element has a second length that is in the range of two to twenty-five percent greater than the first length.

14. A one-way clutch comprising:
a first member having multiple first recesses that each have a load-bearing surface;
a second member having multiple second recesses that are alignable with the first recesses, each second recess having a load-bearing surface; and
multiple engaging elements that are engageable with the load-bearing surfaces of the recesses to effect one-way torque transfer between the first and second members, wherein at least one of the engaging elements comprises a non-metallic, compressible material and is configured to compress upon engagement with a respective load-bearing surface of each member to inhibit relative movement of the members, and wherein the at least one engaging element is longer than another one of the engaging elements.

15. The one-way clutch of claim 14 wherein the at least one engaging element is at least five percent longer than another one of the engaging elements.

16. The one-way clutch of claim 14 wherein the at least one engaging element has a length that is in the range of two to twenty-five percent greater than a length of another one of the engaging elements.

17. The one-way clutch of claim 14 wherein the at least one engaging element comprises rubber.

18. The one-way clutch of claim 14 wherein the at least one engaging element comprises plastic.

19. The one-way clutch of claim 14 wherein the first and second members each have a generally planar clutch face, the clutch face of the first member including the first recesses, and the clutch face of the second member including the second recesses.

20. The one-way clutch of claim 14 wherein the first and second members each have a circumferential surface in close-spaced opposition with the circumferential surface of the other member, the circumferential surface of the first member including the first recesses, and the circumferential surface of the second member including the second recesses.

21. The one-way clutch of claim 14 wherein at least two of the engaging elements at least partially comprise a non-metallic, compressible material, each of the at least two engaging elements being configured to compress upon engagement with a respective recess of each member to inhibit relative movement of the members.

22. A one-way clutch comprising:
a first member including multiple first recesses that each have a load-bearing surface;
a second member including multiple second recesses that are alignable with the first recess, each second recess having a load-bearing surface; and
multiple engaging elements that are engageable with the load-bearing surfaces of the recesses to facilitate one-way torque transfer between the first and second members, wherein a first one of the engaging elements comprises metal, and a second one of the engaging elements comprises a non-metallic, compressible material and is configured to compress upon engagement with a respective load-bearing surface of each member to inhibit relative movement of the members.

23. The one-way clutch of claim 22 wherein the second engaging element is longer than the first engaging element.

24. The one-way clutch of claim 22 wherein the first engaging element has a first length, and the second engaging element has a second length that is at least five percent greater than the first length.

25. The one-way clutch of claim 22 wherein the first engaging element has a first length, and the second engaging element has a second length that is in the range of two to twenty-five percent greater than the first length.

26. The one-way clutch of claim 22 wherein the first engaging element is configured to carry more load than the second engaging element when the first and second engaging elements are each engaged with the first and second members.

27. The one-way clutch of claim 22 wherein the second engaging element comprises rubber.

28. The one-way clutch of claim 22 wherein the second engaging element comprises plastic.

* * * * *

UNITED STATES PATENT AND TRADEMARK OFFICE
CERTIFICATE OF CORRECTION

PATENT NO. : 6,854,577 B2
DATED : February 15, 2005
INVENTOR(S) : Stephen M. Ruth It is certified that error appears in the above-identified patent and that said Letters Patent is hereby corrected as shown below:

Column 10,
Line 53, delete "recess" and insert therefor -- recesses --.

Signed and Sealed this

Twenty-fourth Day of May, 2005

JON W. DUDAS
*Director of the United States Patent and Trademark Office*